United States Patent [19]
Hodges et al.

[11] Patent Number: 5,675,796
[45] Date of Patent: Oct. 7, 1997

[54] CONCURRENCY MANAGEMENT COMPONENT FOR USE BY A COMPUTER PROGRAM DURING THE TRANSFER OF A MESSAGE

[75] Inventors: Clark Douglas Hodges; Antony S. Williams, both of Redmond; Johann Posch, Mercer Island, all of Wash.

[73] Assignee: Microsoft Corporation, Redmond, Wash.

[21] Appl. No.: 699,137

[22] Filed: Aug. 16, 1996

Related U.S. Application Data

[63] Continuation of Ser. No. 224,859, Apr. 8, 1994, abandoned.
[51] Int. Cl.⁶ .................................................. G06F 15/00
[52] U.S. Cl. .................... 395/670; 395/671; 395/672; 395/608
[58] Field of Search .................................. 395/701, 670, 395/671, 672, 601, 608, 615

[56] References Cited

U.S. PATENT DOCUMENTS

| | | | |
|---|---|---|---|
| 4,553,202 | 11/1985 | Trufyn | 395/742 |
| 4,809,168 | 2/1989 | Hennessy et al. | 395/674 |
| 4,847,751 | 7/1989 | Nakade et al. | 395/677 |
| 5,095,421 | 3/1992 | Freund | 395/671 |
| 5,175,852 | 12/1992 | Johnson et al. | 395/608 |
| 5,210,874 | 5/1993 | Karger | 395/684 |
| 5,218,699 | 6/1993 | Brandle et al. | 395/684 |
| 5,274,809 | 12/1993 | Iwasaki et al. | 395/674 |
| 5,305,455 | 4/1994 | Ausclinetz et al. | 395/670 |
| 5,319,782 | 6/1994 | Goldberg et al. | 395/674 |
| 5,421,013 | 5/1995 | Smith | 395/677 |
| 5,515,492 | 5/1996 | Li et al. | 395/329 |
| 5,561,797 | 10/1996 | Gilles et al. | 395/608 |

*Primary Examiner*—Parshotam S. Lall
*Assistant Examiner*—Viet Vu
*Attorney, Agent, or Firm*—Seed and Berry LLP

[57] ABSTRACT

An improved mechanism for communicating between computer programs is provided. In a preferred embodiment of the present invention, a computer system has a source computer program, a destination computer program and a communication mechanism for sending a communication from the source computer program to the destination computer program. The communication mechanism contains a concurrency management mechanism for handling events when a communication is pending. The source computer program sends a communication to the destination computer program using the communication mechanism. While the remote communication is pending, the concurrency management mechanism of the preferred embodiment provides concurrency management. The source computer program then receives a reply to the communication from the destination computer program.

27 Claims, 10 Drawing Sheets

CONCURRENCY MANAGEMENT COMPONENT FOR USE BY A COMPUTER PROGRAM DURING THE TRANSFER OF A MESSAGE

CROSS REFERENCE TO RELATED APPLICATION

This application is a continuation of U.S. patent application Ser. No. 08/224,859, filed Apr. 8, 1994, now abandoned.

TECHNICAL FIELD

The present invention relates generally to data processing systems and, more particularly, to providing concurrency management in a communication mechanism.

BACKGROUND OF THE INVENTION

Many conventional computer systems provide remote procedure call (RPC) facilities. Such RPC facilities allow a "calling process" to make a call to a procedure that is part of a "remote process" to perform actions on behalf of the calling process. A remote process is a process not within the address space of a calling process.

FIG. 1 depicts the interaction amongst computer components that are used in a typical RPC. These components include a memory 102 that contains a calling process 106, an RPC facility 108 and a remote process 104. The remote process 104 contains procedures 110, 112 and 114 that may be called by the calling process 106 via the RPC facility 108. After the calling process 106 invokes one of the procedures 110, 112, 114 of the remote process 104, the calling process later receives the results of the invocation through the RPC facility 108. Typically, the calling process 106 must wait for the RPC to complete before performing further processing.

FIG. 2 depicts a flowchart of the steps performed for a typical RPC. The calling process 106 first specifies which remote procedure 110, 112, 114 of the remote process 104 to invoke (step 202). After specifying which procedure to invoke, the calling process 106 provides the appropriate parameters for that procedure in a call. Next, the calling process 106 invokes the RPC facility 108 and passes the RPC facility a procedure identifier for the procedure to be called together with the parameters for that procedure (step 204). The RPC facility 108 receives the procedure identifier and the forwarded parameters, locates the requested procedure within the remote process 104, and invokes the requested procedure with the forwarded parameters (step 206). The remote procedure processes the received parameters and returns the results of the procedure call to the RPC facility 108 (step 208). The RPC facility 108, in turn, returns the received results from the remote procedure to the calling process 106 (step 210). While the RPC facility 108 invokes the remote procedure 110, 112, 114, the calling process 106 is unable to perform any other operations, thereby being "blocked."

There are two methods by which an RPC can be invoked: asynchronously and synchronously. A synchronous invocation of a remote procedure refers to when the calling process 106 is blocked while the RPC is processing (as described in FIG. 2). The alternative approach to a synchronous RPC is an asynchronous RPC. An asynchronous RPC is one in which the execution of the calling process and the RPC are not synchronous. An asynchronous RPC allows the calling process 106 to perform other operations while the RPC is processing ("pending"). When a calling process 106 invokes an RPC asynchronously, the calling process 106 may perform other operations; thus providing for more efficient operation of the calling process 106. When the calling process 106 performs other operations, the calling process 106 may perform operations on a separate path of execution ("thread"). When a calling process 106 can perform multiple paths of execution, the calling process 106 is known as being multi-threaded. Although performing an asynchronous RPC increases the efficiency of a calling process 106, there are problems associated with asynchronous RPCs.

One problem associated with asynchronous RPCs is that the calling process 106 must perform concurrency management. Concurrency management refers to managing multiple threads so that each thread may concurrently execute in a reliable and robust manner. For example, when a calling process 106 has many asynchronous RPCs pending at once, the calling process 106 must ensure that the returned results from one RPC are returned to the proper thread and that the threads do not cross. In addition, when a calling process 106 can accept RPCs from other processes, each incoming RPC requires a separate thread to be forked and requires concurrency management of the threads. If the threads for either outgoing or incoming RPCs cross, the calling process 106 operates in an undesirable manner. Therefore, each process that performs asynchronous RPCs is responsible for performing concurrency management.

Another problem with performing asynchronous RPCs is that the calling process 106, bears the burden of determining the location of the procedure (i.e., whether the procedure is local or remote) to be called. Here, the mechanics of the RPC are not transparent to the calling process 106. For example, suppose that a calling process 106 sends an RPC request and then performs other operations while waiting for a reply to the pending RPC. However, if the RPC is instead local to the calling process 106, the procedure call executes and returns instantaneously, and the calling process 106 is not capable of handling the results from the procedure call at that time. Therefore, since a calling process 106 must know the location of the procedure, the calling process 106 has less flexibility when using an RPC facility 108. In addition, the code of the calling process 106 is more complex since the calling process 106 must know the location of the procedures the calling process wishes to invoke.

The second method by which an RPC can be invoked is a synchronous method. The steps performed in synchronous operation of RPCs is described in the text associated with FIG. 2. Although synchronous operations of an RPC avoids the problems inherent with the asynchronous operations of an RPC, the resources of the calling process 106 are used less efficiently. In addition, when a calling process 106 invokes RPCs synchronously, the calling process 106 is prone to deadlock. Deadlock refers to a situation in which two processes are at a standstill waiting for each other to perform some operation. Since each process is waiting on the other, neither process is able to perform an operation and, thus, both processes are put in a state of perpetually waiting for the other process. For example, the problem of deadlock may arise when a calling process 106 is performing a synchronous RPC and is blocked while the RPC is pending. While the RPC for the calling process 106 is pending, the remote process 104 may be waiting on a response to an RPC or other communication that the remote process 104 has sent to the calling process 106. Since the calling process 106 is blocked, both the calling process 106 and the remote process 104 are deadlocked.

One solution to the problems associated with the synchronous RPC scenario is to provide a timer. The timer is used while an RPC is pending. Upon expiration of the timer, the calling process 106 treats the RPC as having failed. The calling process 106 then restarts the RPC that the calling process 106 believes has failed. As the calling process 106 invokes the RPC for a second time, the remote process 104 may have already completed processing the initial RPC. The remote process 104 may then be put in a state of waiting for a response, but the response will never arrive since the calling process 106 believes the RPC has failed. Such an occurrence wastes system resources by stranding RPCs. In addition, a deadlock may arise. Furthermore, stranding RPCs leads to operations being performed on the remote process more than the number of times that the operations are intended to have occurred. If the remote process 104, for example, contains procedures that manipulate a computer screen display and a particular RPC moves the cursor, since the RPC will be executed twice due to a stranded RPC, the cursor movement would be twice of that intended.

SUMMARY OF THE INVENTION

In accordance with a first aspect of the present invention, a method is executed in a computer system having a source computer program, a destination computer and a communication mechanism for sending communications from the source computer program to the destination computer program. In accordance with this method of the first aspect of the present invention, the communication mechanism has a concurrency management component for handling events. This method of the first aspect of the present invention provides a method for communicating between computer programs wherein the source computer program sends a communication to the destination computer program, the concurrency management component handles events while the communication is pending, and the source component receives a reply to the communication from the destination component.

In accordance with a second aspect of the present invention, the computer system contains a source component, a communication mechanism, and a destination component. The source component provides for sending a communication to a destination component and for instructing the communication mechanism for processing while a communication is pending. The communication mechanism provides for sending a communication from the source component to the destination component and further comprises a concurrency management component. The concurrency management component provides for executing the instructions received from the source component while the communication is pending. The destination component provides for receiving the communication from the communication mechanism.

DETAILED DESCRIPTION OF THE INVENTION

The preferred embodiment of the present invention provides an improvement over the prior art for performing RPCs. The preferred embodiment of the present invention provides a concurrency management mechanism for a calling process that wishes to make an RPC. Therefore, since a calling process does not need to perform concurrency management, the code of the calling process is simplified. In addition, the preferred embodiment of the present invention provides a method and system for communication between processes that is as robust as synchronous RPC, yet as flexible as asynchronous RPC. The method and system for communication of the preferred embodiment is provided through a robust interface and a registration mechanism that are flexible enough to perform concurrency management for any process. Therefore, the preferred embodiment of the present invention leads to a more efficient use of the resources of a calling process and to an increase in system throughput and reliability.

Figure 1:
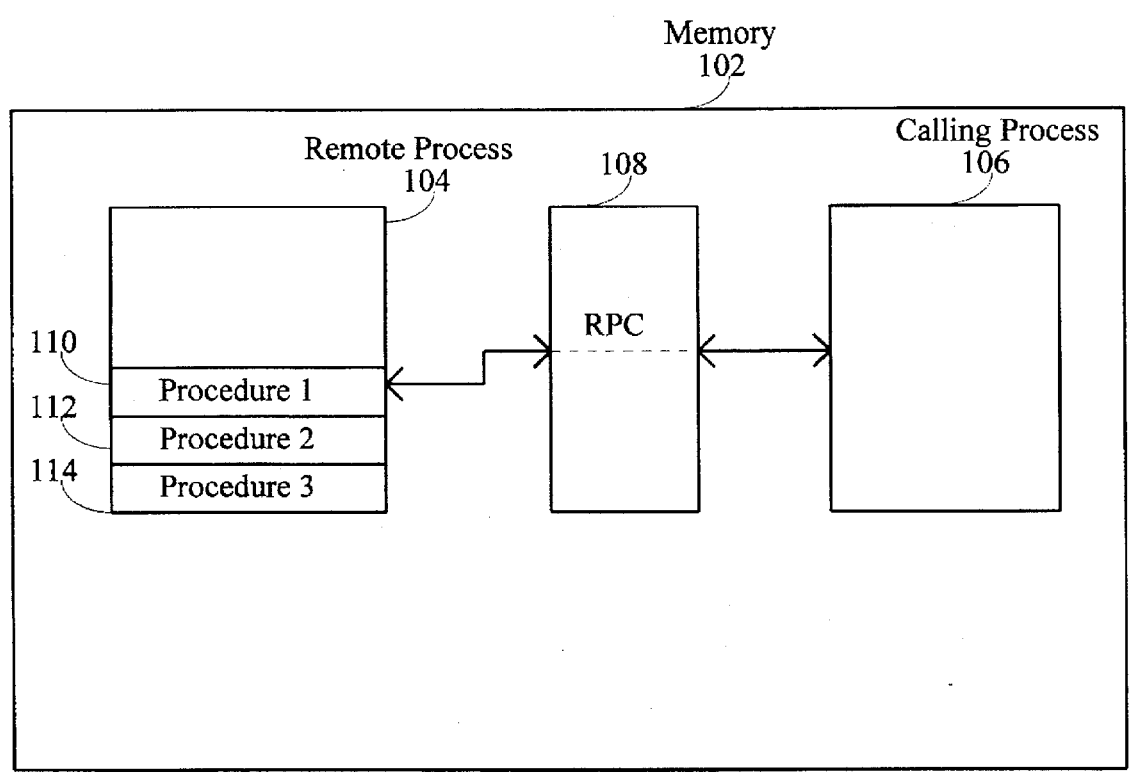
FIG. 1 depicts a conventional computer system for invoking a remote procedure call.
Figure 2:
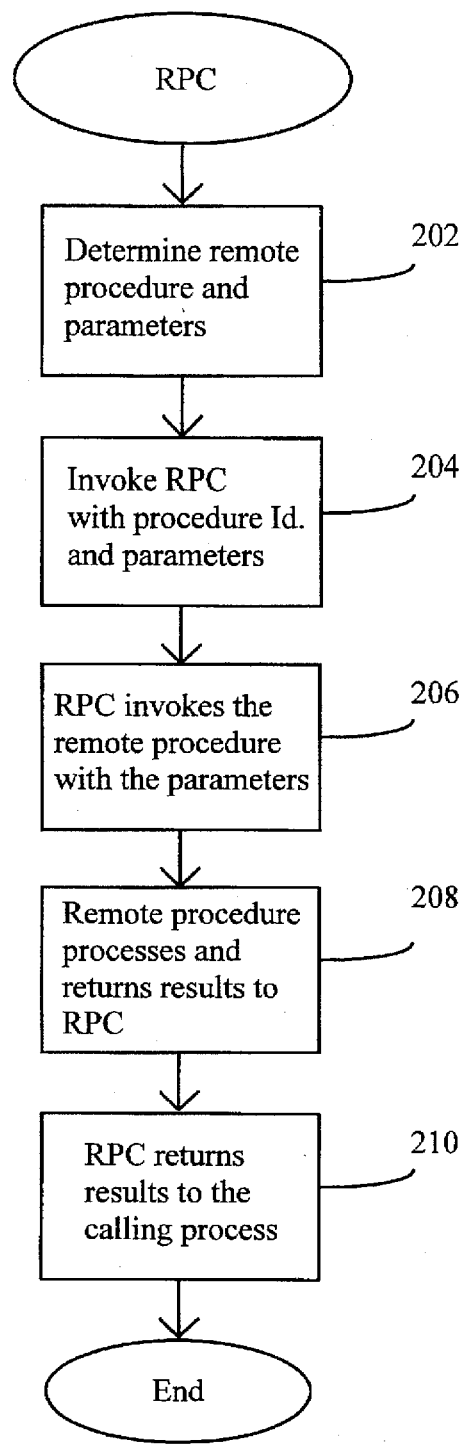
FIG. 2 depicts a flowchart of the steps performed by the conventional computer system of FIG. 1 in invoking a remote procedure call.
Figure 3:
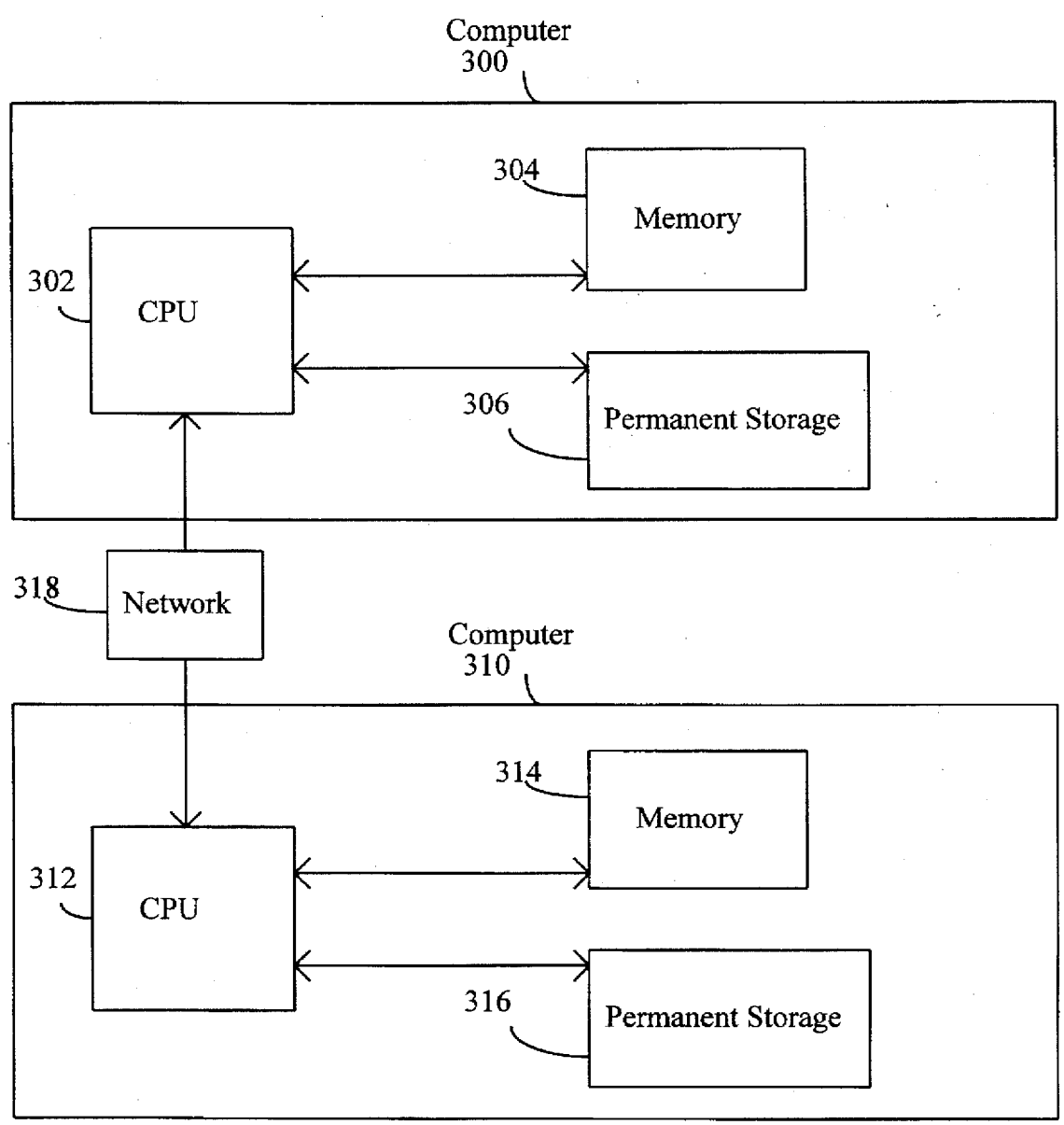
FIG. 3 depicts a distributed system suitable for practicing the preferred embodiment of the present invention.

FIG. 3 depicts a distributed system suitable for practicing the preferred embodiment of the present invention. The distributed system contains two computers 300, 310 connected via a network 318. The network 318 can be any communication mechanism including, but not limited to, a local area network or a wide area network. Each computer 300, 310 contains a central processing unit (CPU) 302, 312, a memory 304, 314 and a permanent storage device 306, 316. Those skilled in the art will appreciate that the computers 300, 310 may also include additional components. The CPU 302, 312 is responsible for transferring computer programs between the permanent storage device 306, 316 and the memory 304, 314, and executing the computer programs once the computer programs are resident within the memory. The permanent storage device 306, 316 is a storage device for storing information in between invocations of the computers 300, 310. Although the preferred embodiment of the present invention is described as being used on a distributed system, one skilled in the art will appreciate that the preferred embodiment can be used on a single computer system. For purposes of clarity, the present invention is described relative to a single computer system.

The preferred embodiment of the present invention is designed to operate in an object-oriented environment, such as an environment that supports the Microsoft OLE 2.0 ("OLE") protocol established by Microsoft Corporation of Redmond, Wash. The environment in which the preferred embodiment of the present invention is practiced follows an underlying component object model. An object is a logical structure that includes data structures for holding data and may include functions that operate on the data held in the data structures. An object may hold just data and not include code for manipulating the data. An object is a useful structure for encapsulating data and behavior into a single logical entity.

Objects are organized into "classes." An object class is a group of objects with similar properties and common behavior. Each object is a member of a class and constitutes an instance of the object class. All members of a class include at least the properties defined for the object class, but the value of these properties may vary among the objects of the object class.

Another concept exploited in the preferred embodiment of the present invention is the notion of an "interface." An interface is a named set of logically related functions ("methods"). An interface lists signatures (such as parameters) for a set of methods. For instance, an example interface may define the signatures for various methods that are used to display an object on a video display. An interface does not provide code for implementing the methods; rather, the code for implementing the methods is provided by objects. Objects that provide the code for implementing the methods of an interface are said to "support" the interface. The code provided by an object that supports an interface must comply with the signatures provided within the interface. In the C++ programming language, an interface constitutes a set of virtual functions. Although the preferred embodiment of the present invention is described as being implemented in an object-oriented environment, those skilled in the art will appreciate that the present invention may also be practiced in non-object-oriented environments.

Figure 4:
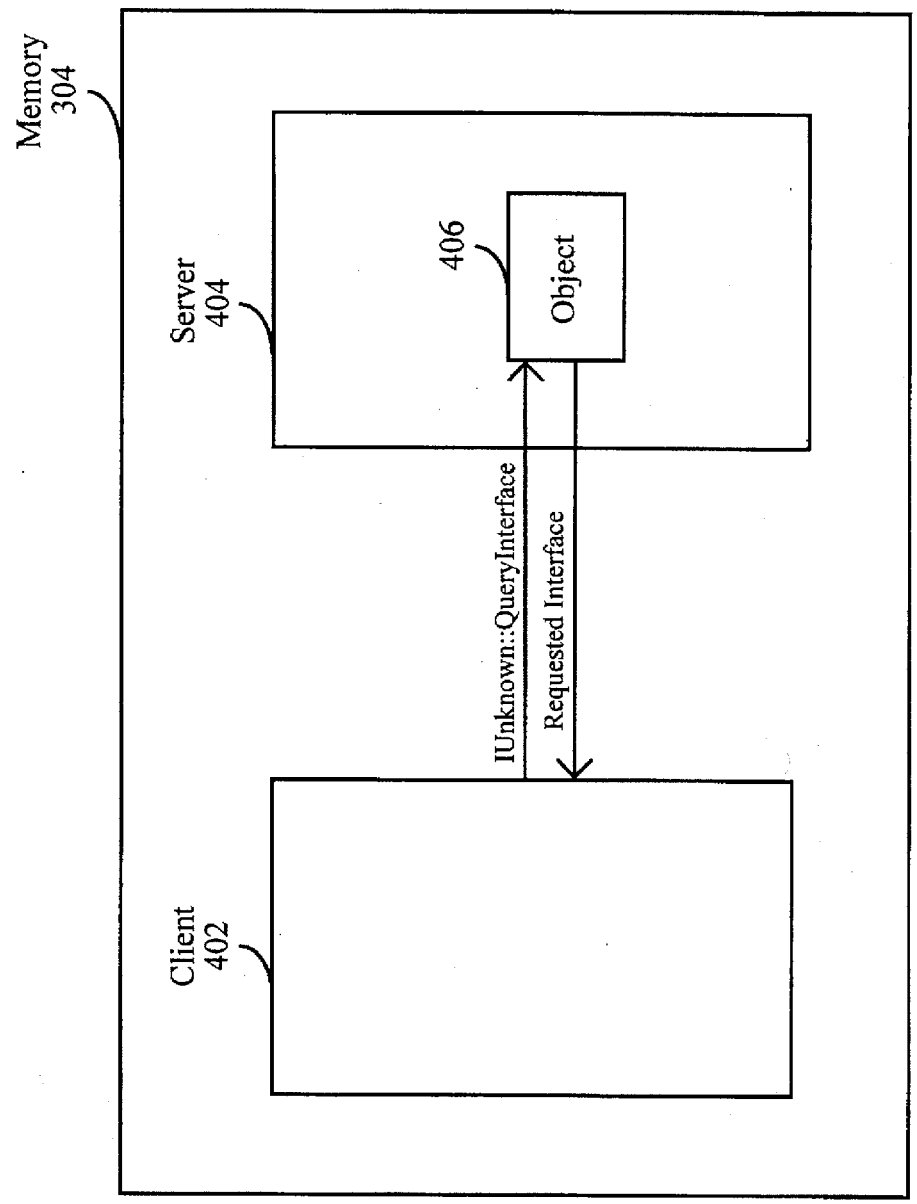
FIG. 4 depicts a component object model used by the preferred embodiment of the present invention.

The basic concepts of the component object model may be explained relative to the block diagram of FIG. 4. The memory 304 of the computer contains a client 402 and a server 404. The client 402 and the server 404 are computer programs in a state of operation. The server 404 controls an object 406. Although the object 406 is depicted as being within the address space of the server 404, the object 406 may be in separate address space or on the permanent storage device 306. In addition, one skilled in the art will recognize that the object 306 may reside on other devices or computers. The client 402 uses an interface that is provided by the object 406 to manipulate the object 406. The client 402 does not know of the implementation of the object 406 or the server 404. Only the server 404 knows of the implementation of the object 406 and how to manipulate the object 406. Since the client 402 does not know of the implementation of the object, the client 402 is "data independent." Data independence allows the developer of the client 402 to write code which works with new types of data and interacts with new computer programs without having to change the code of the client 402. Since the internal representation of the object 406 is hidden from the client 402, the client 402 manipulates the object through the use of an interface.

All objects in the component object model are required to support the IUnknown interface. Since all objects support the IUnknown interface, when a client 402 wishes to manipulate an object 406, the client 402 first accesses the IUnknown interface in order to access the interface that provides the appropriate methods to perform the desired manipulation. One method contained within the IUnknown interface is the QueryInterface method. The client 402 uses the QueryInterface method of the IUnknown interface to obtain a pointer to a desired interface from the object 406. If the object 406 supports the requested interface, the object 406 returns a pointer to the requested interface to the client 402. After receiving a pointer to the requested interface, the client 402 can directly manipulate the object 406 using the methods contained in the requested interface. Since the client 402 does not know of the implementation of the methods nor does the client 402 know of the internal representations of the object 406, the code of the client 402 is flexible and can support new forms of objects without having to change because the code of the client 402 is data independent.

Consider an example where a client 402 is a word processing document, a server 404 is a spreadsheet program, and an object 406 is a range of cells within the spreadsheet program. In view of the component object model, the object 406 may appear as part of the client 402 to the user and may be manipulated by the user while running the client 402. For instance, suppose that the user modifies the cells in the object 406 while running the client 402, the client 402 would then invoke the methods that implement the modifications in order to manipulate the object 406.

The preferred embodiment of the present invention provides a concurrency management ("CM") mechanism that is part of an RPC library. The CM mechanism runs within the address space of a calling process and invokes procedures of remote processes on behalf of a local calling process. During the invocation of remote procedures, the CM mechanism provides concurrency management for the calling process, thereby reducing the likelihood of deadlock and reducing the complexity of the code of the calling process.

Figure 5:
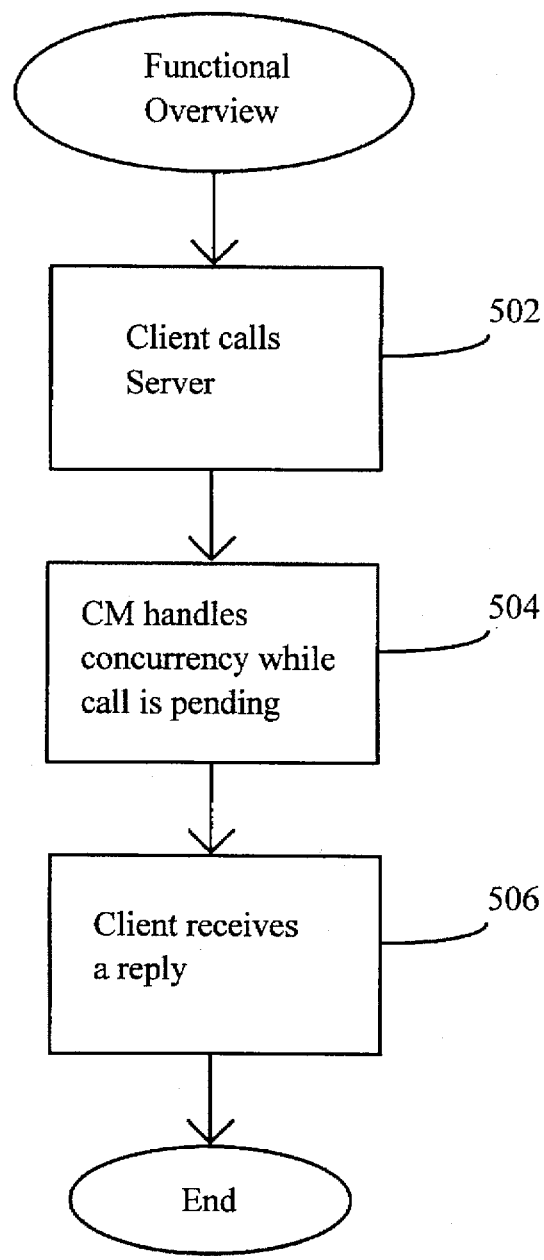
FIG. 5 depicts a flowchart of the steps performed in utilizing the concurrency management mechanism of the preferred embodiment of the present invention.

To better understand the functionality of the CM mechanism, consider FIG. 5, which depicts a flowchart of an overview of the steps performed by the CM mechanism. In using the CM mechanism, a client 402 (e.g., a calling computer program) performs an RPC on a server 404 (e.g., a remote computer program) (step 502). While the RPC is pending, the CM mechanism handles concurrency management (step 504). If the client 402 receives a message other than a successful reply to the RPC (known as a "contingency") during the time that the RPC is pending, the CM mechanism processes the contingency. After some period of time, the client 402 receives a successful reply to the RPC from the server 404 (step 506). After a successful reply has been received by the client 402, the processing of the CM mechanism ends.

In order for a client to utilize the CM mechanism, the client 402 first registers with the CM mechanism and passes an interface to the CM mechanism for use by the CM mechanism to handle contingencies while an RPC is pending. The procedure that the client 402 calls to register with the CM mechanism is the CoRegisterMessageFilter procedure which is provided by the CM mechanism. The CoRegisterMessageFilter procedure takes a pointer to an IMessageFilter interface that the client provides (defined below) as input and also accepts a pointer to a pointer of an IMessageFilter wherein the previously registered IMessageFilter interface is returned to the calling client 402. The IMessageFilter interface contains three procedures: the HandleIncomingCall procedure, the RetryRejectedCall procedure, and the MessagePending procedure. The HandleIncomingCall, RetryRejectedCall and MessagePending procedures are discussed below in detail. After calling the CoRegisterMessageFilter procedure, a return value is returned to the client 402 so that the client 402 can determine whether the CoRegisterMessageFilter procedure call was successful. The return value will have an S_OK value if the CoRegisterMessageFilter procedure call was successful and will have another value if the CoRegisterMessageFilter procedure call was not successful. The CoRegisterMessageFilter procedure and the IMessageFilter interface are defined in Code Table 1. All code provided herein is described using the C++ programming language.

---

Code Table 1

HRESULT CoRegisterMessageFilter(lpMsgFilter, lplpMsgFilterPrev)

| Argument | Type |
| --- | --- |
| lpMsgFilter | IMessageFilter* |
| lplpMsgFilterPrev | IMessageFilter** |
| return value | HRESULT | interface IMessageFilter:IUnknown {
    virtual DWORD HandleIncomingCall(dwCallType, htaskCaller,
        dwTickCount, IpInterfaceInfo) = 0;
    virtual DWORD RetryRejectedCall(htaskCallee, dwTickCount,
        dwRejectType) = 0;
    virtual DWORD MessagePending(htaskCallee, dwTickCount,
        dwPendingType) = 0;
};

---

Figure 6:
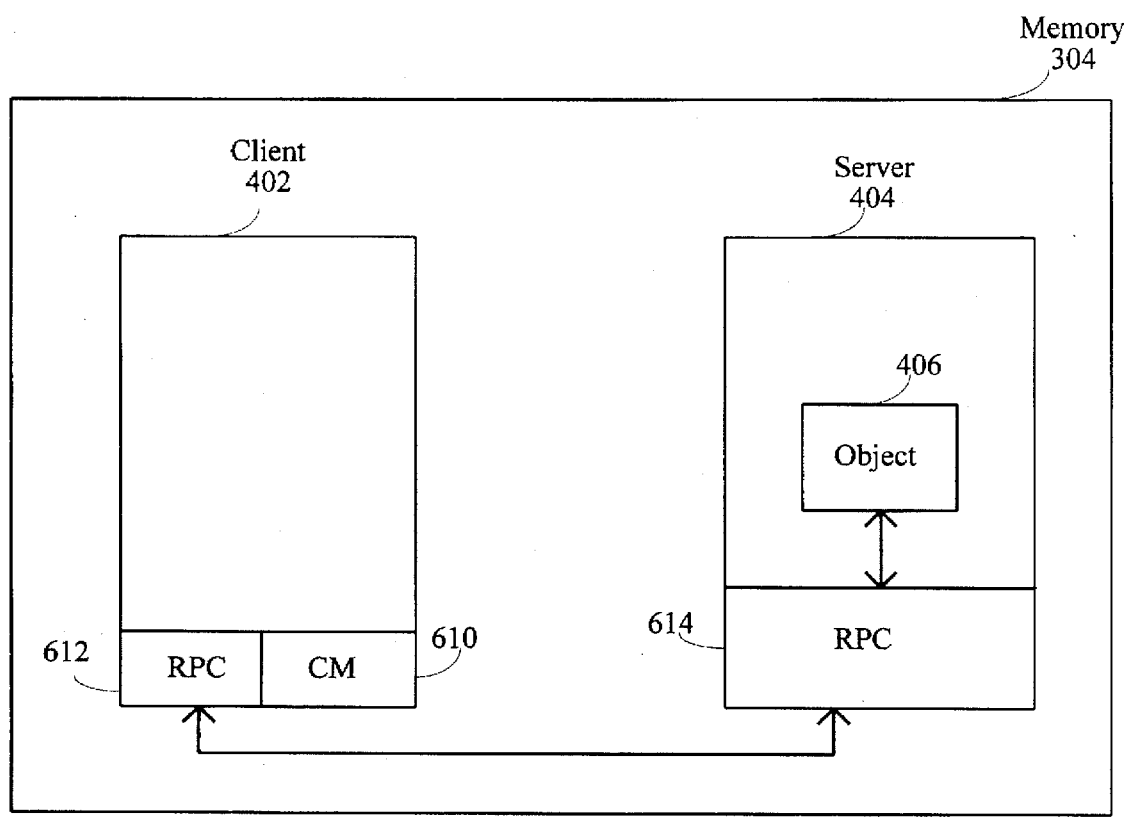
FIG. 6 depicts a more detailed diagram of the memory of a computer system in FIG. 3.

FIG. 6 depicts a more detailed diagram of the memory of a computer system 300 suitable for practicing the preferred embodiment of the present invention. When using the CM mechanism 610 of the preferred embodiment, a client 402 and a server 404 are resident within the memory 304 of a computer. The client 402 contains the CM mechanism 610, and an RPC facility 612. The server 404 contains an object 406 and an RPC facility 614. The CM mechanism 610 and the RPC facility 612, 614 are copies of libraries linked at runtime. Linking a library at runtime is known as "dynamic linking," thus the CM mechanism 610 and the RPC facility 612, 614 are dynamically linked libraries. When the client 402 performs an RPC on the object 406 within the server 404, the client 402 typically sends a request to the CM mechanism 610, although the client can communicate directly to the RPC facility 612. The CM mechanism 610, in turn, invokes the RPC using the RPC facility 612 and performs concurrency management while the RPC is pending. After the RPC facility 612 in the client 402 sends the RPC to the server 404, the RPC facility 614 in the server 404 receives the RPC. The RPC facility 614 sends the request to the object 406 wherein the object 406 performs the requested method and returns the results to the RPC facility 614. The RPC facility 614 sends the results from performing the method to the RPC facility 612 of the client 402. Upon receipt of the results of the RPC, the RPC facility 612 sends the results to the CM mechanism 610, and the CM mechanism 610 passes the results to the client 402. As a result, the client 402 is relieved of the responsibility of concurrency management.

Although the preferred embodiment of the present invention is described as providing communication between a client and an object, one skilled in the art will recognize that the present invention can also be used to provide communication between computer programs, processes, threads of execution, procedures, or other software or hardware entities. In addition, although the preferred embodiment is described as providing communication between a client and a server on the same computer system, one skilled in the art will appreciate that the present invention can be used with a client and server residing within separate memories on the same computer system or separate computer systems. Further, although the preferred embodiment of the present invention is described as using a remote procedure mechanism, one skilled in the art will appreciate that other means of communication can be used including, but not limited to, interprocess communication, shared memory, shared file, shared bus, or a network such as a local area network or a wide area network.

After registering with the CM mechanism 610, the client 402 may use the CM mechanism by first invoking the CM mechanism with a message containing an RPC. Upon receiving the message, the CM mechanism 610 assigns a logical thread id. to the message. A logical thread id. is a unique identifier which denotes a specific conversation between the client 402 and server 404. Therefore, the logical thread id. is used to match messages with the responses to those messages. By assigning a logical thread id., the CM mechanism 610 is able to distinguish between incoming messages and a reply to the original sent message. In addition, the logical thread id. is used for identifying a nested message and processing the nested message to prevent deadlock. A nested message is a message sent on the same logical thread id. that is not a reply, but an incoming message sent by the server 404. For example, when a client 402 invokes an RPC on the server 404, the server may have to perform some processing in order to complete the RPC. This processing may include sending a message to the client 402. Thus, if the client 402 were to reject the message, deadlock would occur. The CM mechanism 610 solves this problem by identifying nested messages and passing the nested messages to the client 402 for processing to prevent deadlock.

The CM mechanism 610 is responsible for keeping track of all threads and managing the logical thread ids. After the logical thread id. is assigned, the CM mechanism 610 sends the received message ("sent message") and enters a loop where the CM mechanism 610 waits for a message to be received (either a reply to the sent message or some other message). Upon receiving a message other than a reply which indicates that the RPC was successfully completed ("a contingency"), the CM mechanism 610 performs the appropriate processing. The CM mechanism 610 processes contingencies until a successful reply is received.

There are three contingencies that the CM mechanism 610 processes: an incoming message, a retry later message and a window message. An incoming message is any received message other than a successful reply to a sent message or a window message. Thus, an incoming message can originate from another client, a server or some other entity. The CM mechanism 610 determines if the incoming message is a reply to the sent message by comparing the logical thread id. of the incoming message to the logical thread id. of the sent message. A retry later message is a type of reply from the server 404 for the sent message. A retry later message indicates that the server 404 is temporarily unable to process the sent message and the client 402 should resend the sent message at a later time. A window message is a message received from a window manager. The window manager is the software entity responsible for managing the windows in a multiwindow computer system. In a multiwindow computer system, the computer system typically displays one window on the computer display for each computer program currently running. The typical window messages received include: commands to repaint the computer display or a portion thereof, commands to indicate movement of the mouse, or task switching. Task switching, in this sense, refers to the computer user switching between windows on the computer screen, thereby activating a window.

Figure 7:
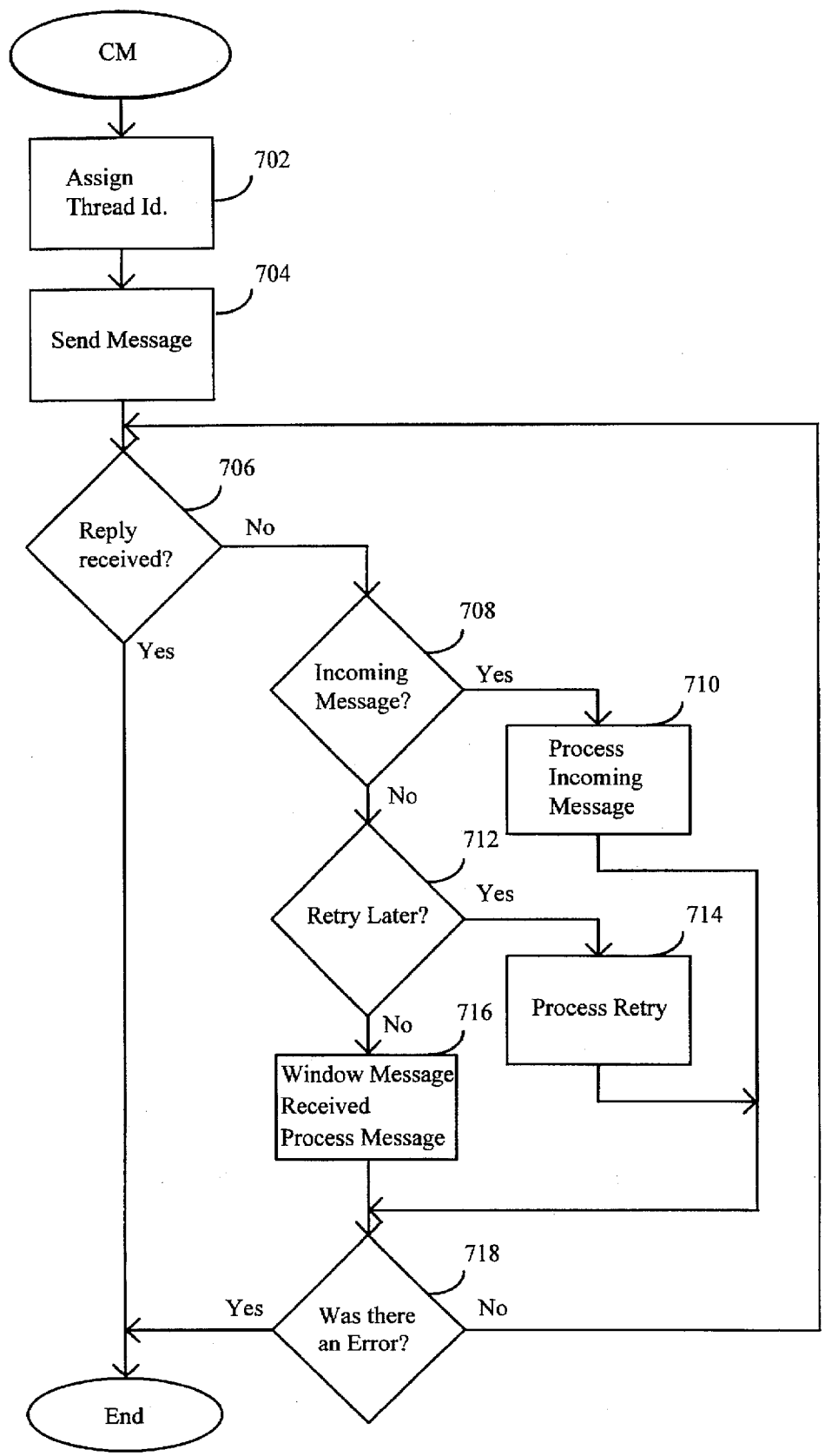
FIG. 7 depicts a flowchart of the steps performed by the concurrency management mechanism of the preferred embodiment of the present invention.

FIG. 7 depicts a flowchart of the steps performed by the CM mechanism 610 of the preferred embodiment. The first step that the CM mechanism 610 performs upon invocation is to assign a logical thread id. to the received message (step 702). After assigning a logical thread id., the CM mechanism 610 sends the message to the server 404 (step 704). Once the message has been sent, the CM mechanism enters a loop to wait for a successful reply to the sent message (step 706). If a successful reply to the sent message is received by the CM mechanism 610, the CM mechanism returns the successful reply to the client 402 and ends processing. However, the CM mechanism 610 may receive messages other than a successful reply to the sent message. Therefore, the CM mechanism 610 first checks to determine if the received message is an incoming message (step 708). If the received message is an incoming message, the CM mechanism 610 processes the incoming message (step 710). If the received message is not an incoming message, the CM mechanism 610 determines if the received message is a retry-later-reply to the sent message (step 712). If the received message is a retry-later-reply to the sent message, the CM mechanism 610 processes the retry-later-reply (step 714). If the received message is not a retry-later-reply, the received message is a window message and, therefore, the CM mechanism 610 processes the window message (step 716). After the CM mechanism 610 has processed an incoming message (step 710), processed a retry-later-reply (step 714) or processed a window message (step 716), the CM mechanism 610 determines if an error occurred (step 718). If no error occurred, processing continues at step 706, wherein the CM mechanism 610 continues waiting. However, if an error occurred, the CM mechanism 610 ends execution, thereby terminating the RPC of the client 402.

When processing an incoming message (i.e., step 710 of FIG. 7), the CM mechanism 610 first processes the incoming message by invoking the HandleIncomingCall routine that is part of the IMessageFilter interface provided by the client 402. The client 402 defined and registered the HandleIncomingCall routine with the CM mechanism 610 by calling the CoRegisterMessageFilter routine. Upon receiving the results of the HandleIncomingCall routine, the CM mechanism 610 performs processing in response thereto. The HandleIncomingCall routine acts as a single entry point for all messages received by the client 402. Since the HandleIncomingCall routine is implemented by the client 402, the HandleIncomingCall routine determines when the client 402 is in a state to handle the incoming message, reject the incoming message, or is in a temporary state of rejection. The client 402 makes the decision whether to handle, reject or temporarily reject the incoming message based on the parameters of the HandleIncomingCall routine. The HandleIncomingCall routine and the parameters used by the HandleIncomingCall routine are defined in Code Table 2.

Code Table 2

DWORD IMessageFilter::HandleIncomingCall (dwCallType, htaskCaller, dwTickCount, lpInterfaceInfo)

| Argument | Type |
| --- | --- |
| dwCallType | DWORD |
| htaskCaller | HTASK |
| dwTickCount | DWORD |
| lpInterfaceInfo | LPINTER_FACEINFO |
| return_value | DWORD |

The dwCallType parameter of the HandleIncomingCall routine indicates the type of incoming message received as well as the logical thread id. for the incoming message. The appropriate values for the dwCallType parameter include: CALLTYPE_TOPLEVEL, CALLTYPE_NESTED, CALLTYPE_ASYNC, CALLTYPE_TOPLEVEL_CALLPENDING, and CALLTYPE_ASYNC_CALLPENDING. The CALLTYPE_TOPLEVEL value for the dwCallType parameter indicates that the incoming message was unsolicited by the client 402. That is, the sender of the incoming message is not responding to a message sent by the client 402. The CALLTYPE_NESTED value in the dwCallType parameter indicates that the incoming message is a response on the same logical thread id. as the sent message. The CALLTYPE_ASYNC value for the dwCallType parameter indicates that the incoming message is a message sent asynchronously by the sender. Thus, the sender of the asynchronous message is performing other processing while waiting for a response. The CALLTYPE_TOPLEVEL_CALLPENDING value for the dwCallType parameter indicates that the incoming message was unsolicited by the client 402 and the incoming message has a new logical thread id. that differs from the logical thread id. of the sent message. The CALLTYPE_ASYNC_CALLPENDING value in the dwCallType parameter indicates that the incoming message is a message sent asynchronously on a logical thread id. different from the sent message of the client 402.

The htaskCaller parameter of the HandleIncomingCall routine is an identifier of the sender of the incoming message. The dwTickCount parameter of the HandleIncomingCall routine indicates the amount of time elapsed since the client 402 sent the message. Thus, the dwTickCount parameter is only used when the incoming message is a reply to the sent message of the client 402. The dwTickCount parameter can be used by the client 402 to determine whether to resend the message if the user has not waited too long or whether to cancel the message if the user has waited for a long time. The lpInterfaceInfo parameter of the HandleIncomingCall routine is a pointer to a structure which indicates the object for which the incoming message is intended, the interface used to access the object, and the method for invocation in the interface for the object.

The return_value parameter of the HandleIncomingCall routine provides three values: SERVERCALL_ISHANDLED, SERVERCALL_REJECTED, and SERVERCALL_RETRYLATER. The return_value parameter is an output parameter that indicates to the CM mechanism 610 the appropriate processing to be performed. When the return_value parameter indicates SERVERCALL_ISHANDLED, the client 402 indicates to the CM mechanism 610 that the client 402 is able to handle the incoming message and is processing the incoming message. When the return_value parameter indicates SERVERCALL_REJECTED, the client 402 is rejecting the incoming message. When the return_value parameter indicates SERVERCALL_RETRYLATER, the client 402 is indicating that the client 402 is in a temporary state wherein the client 402 is rejecting the incoming message.

Figure 8:
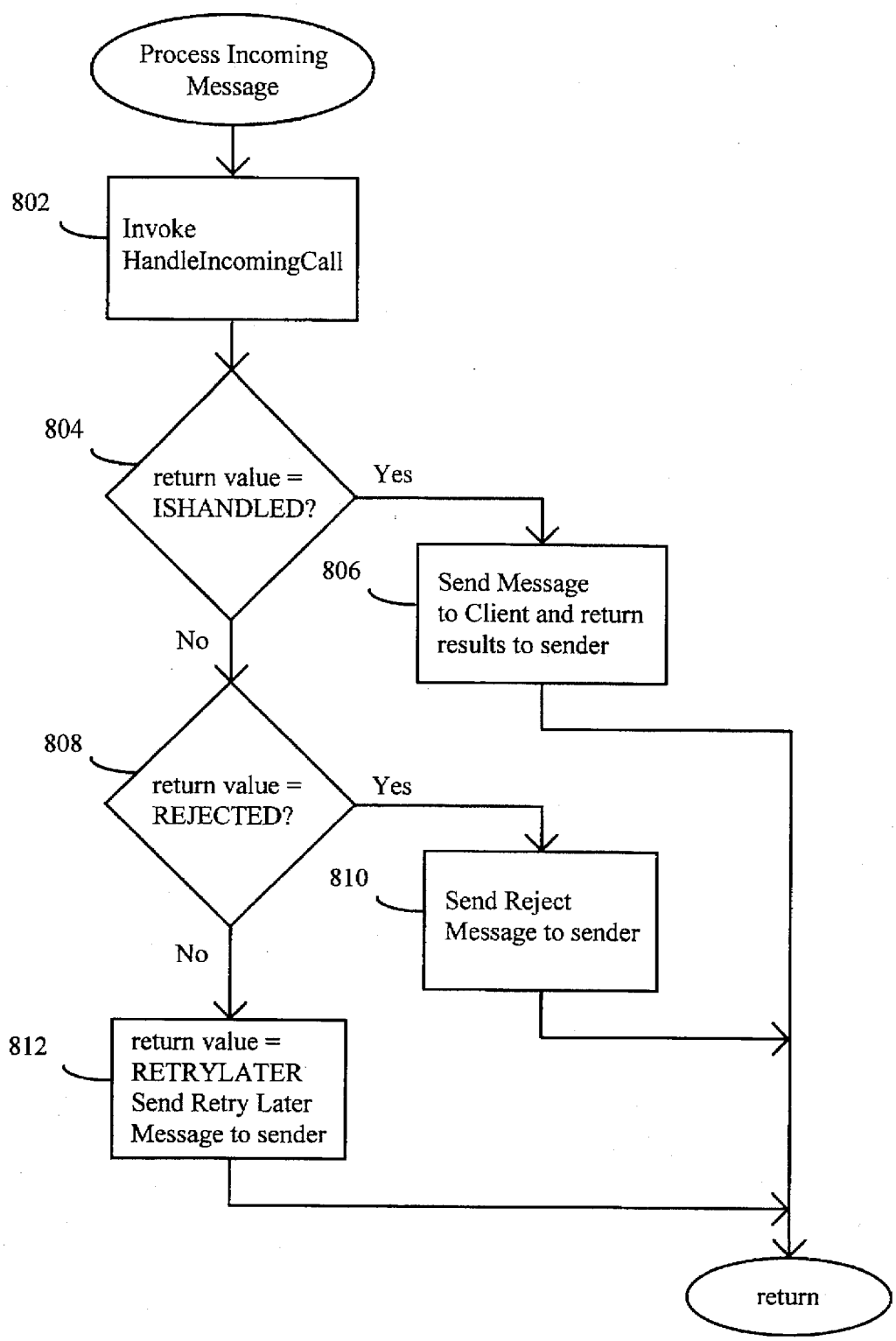
FIG. 8 depicts a flowchart of the steps performed by the concurrency management mechanism of the preferred embodiment for processing an incoming message.

As indicated in FIG. 8, when processing an incoming message, the CM mechanism 610 first invokes the HandleIncomingCall routine as implemented by the client 402 (step 802). After invoking the HandleIncomingCall routine, the CM mechanism 610 receives a return value from the HandleIncomingCall routine. The CM mechanism 610 next determines if the return value designates that the client 402 is handling the incoming message (i.e., return value equivalent to SERVERCALL_ISHANDLED) (step 804). If the client 402 is handling the incoming message, the CM mechanism 610 sends the incoming message to the client 402 and returns the results of the message to the sender of the message (step 806). Next, the CM mechanism 610 determines if the return value of the HandleIncomingCall routine indicates that the client 402 is rejecting the incoming message (i.e., return value equivalent to SERVERCALL_REJECTED) (step 808). If the client is rejecting the incoming message, the CM mechanism 610 sends a rejection message to the sender of the incoming message (step 810). If the return value for the HandleIncomingCall routine does not indicate that the message is handled or is rejected, the CM mechanism 610 determines that the client 402 is a temporary state wherein the client 402 cannot accept the incoming message (i.e., return value equivalent to SERVERCALL_RETRYLATER) (step 812). Therefore, the CM mechanism 610 sends a retry later message to the sender of the incoming message. Sending a retry later message to the sender indicates to the sender that the message has been rejected temporarily, but should be retried at a later time. After the CM mechanism 610 has sent the incoming message to the client 402 (step 806), sent a reject message to the sender (step 810), or sent a retry later message to the sender (step 812), the CM mechanism 610 returns to the higher level processing described in FIG. 7.

When processing a retry later message (i.e., step 714 in FIG. 7), the CM mechanism 610 determines if there are any incoming messages waiting to be processed. The CM mechanism 610 performs this determination because the server 404 may have sent a message to the client 402 on a different logical thread and is rejecting the sent message by the client 402 because the server 404 is in a state of waiting for a reply to the message on the different logical thread. If the CM mechanism 610 determines that there are incoming messages, the CM mechanism processes the incoming messages by invoking the HandleIncomingCall routine. Otherwise, the CM mechanism 610 invokes the RetryRejectedCall routine of the IMessageFilter interface as implemented by the client 402 to determine the appropriate processing to be performed. The RetryRejectedCall routine is implemented by the client 402 and is passed to the CM mechanism 610 as a part of the IMessageFilter interface parameter in the CoRegisterMessageFilter routine. The RetryRejectedCall routine gives the client 402 a chance to determine the appropriate processing upon receiving a retry later message received from the server 404. In order to determine the appropriate processing, the RetryRejectedCall routine may query the user and provide the user with an opportunity to either retry, cancel, or switch execution to the server 404. If execution switches to the server 404, the window corresponding to the server 404 pops to the top of the computer display and the user has an opportunity to change the state of the server 404 so that the message of the client 402 can be processed by the server 404. The user may change the state of the server 404 by manipulation of the server 404 through the Window Manager. Therefore, by using the RetryRejectedCall routine, the client 402 can determine the appropriate processing upon receipt of a retry later message from the server 404. Upon determining the appropriate processing to be performed, the RetryRejectedCall routine returns a return value to the CM mechanism 610 indicating the appropriate processing for the CM mechanism 610 to perform. The RetryRejectedCall routine is defined in Code Table 3.

Code Table 3

DWORD IMessageFilter::RetryRejectedCall(htaskCallee, dwTickCount, dwRejectType)

| Argument | Type |
| --- | --- |
| hTaskCallee | HTASK |
| dwTickCount | DWORD |
| dwRejectType | DWORD |
| return_value | DWORD |

The hTaskCallee parameter of the RetryRejectedCall routine provides an identifier of the server 404 that rejected the sent message of the client 402. The dwTickCount parameter of the RetryRejectedCall routine provides the elapsed time since the message of the client 402 was sent. The dwRejectType parameter of the RetryRejectedCall routine indicates the type of rejection by the server 404. The dwRejectType parameter may assume one of two values: SERVERCALL_REJECTED, or SERVERCALL_RETRYLATER. A value of SERVERCALL_REJECTED in the dwRejectType parameter indicates that the server 404 has rejected the message of the client 402 and is unable to process the message of the client 402. A value of SERVERCALL_RETRYLATER in the dwRejectType parameter indicates that the server 404 is temporarily unable to process the message of the client 402 and the client 402 should resend the message at a later time. The return_value parameter of the RetryRejectedCall routine may assume one of three values: −1, 0–100, or >100. A value for the return_value parameter of −1, indicates to the CM mechanism 610 that the CM mechanism 610 should cancel the message of the client 402. A value for the return_value parameter in the range of 0 to 100, indicates to the CM mechanism 610 that the message of the client 402 should be retried immediately. A value for the return_value parameter that is greater than 100, indicates to the CM mechanism 610 that the CM mechanism 610 should wait for the indicated number of milliseconds and then resend the message of the client 402.

Figure 9:
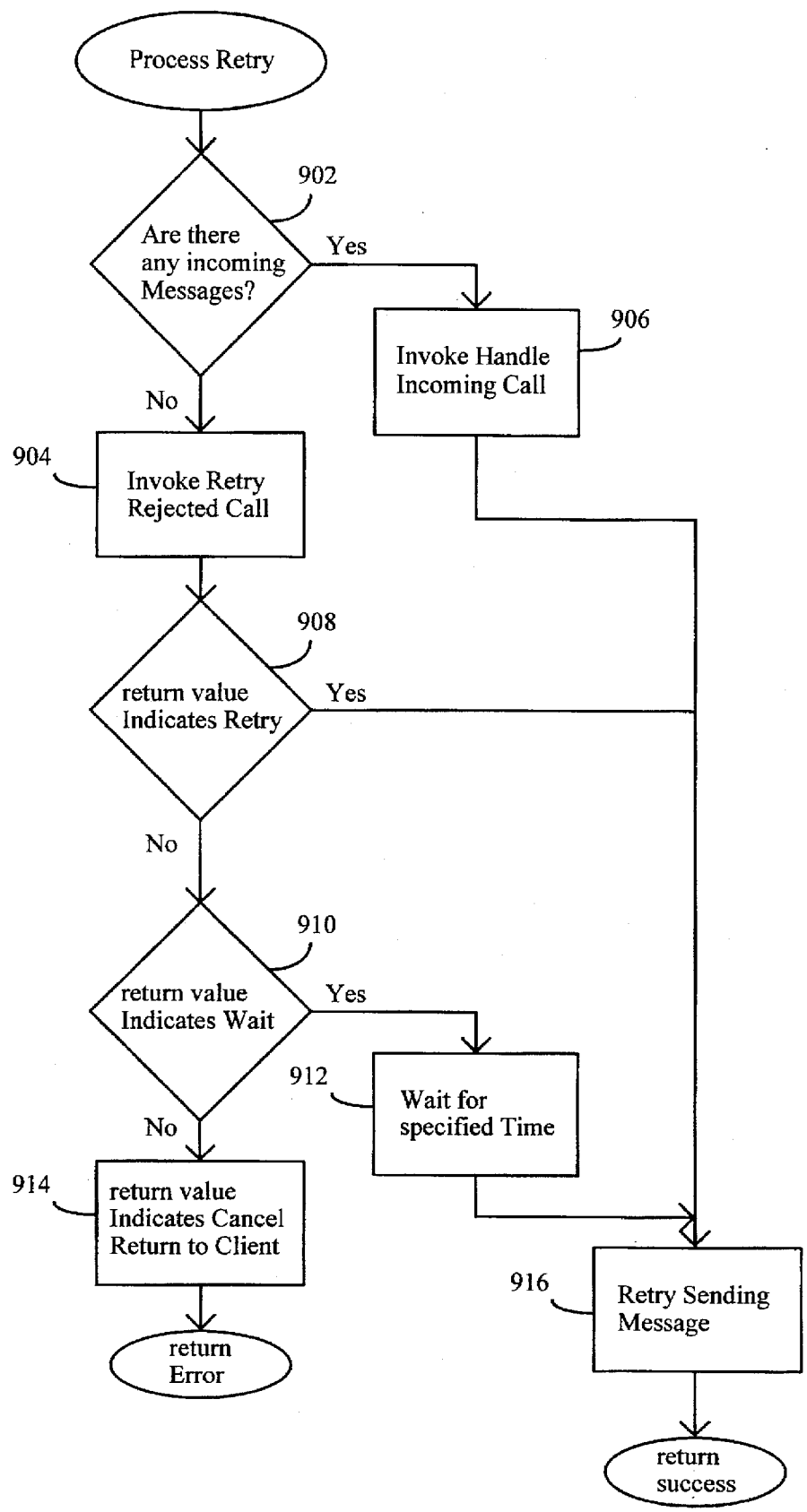
FIG. 9 depicts a flowchart of the steps performed by the concurrency management mechanism of the preferred embodiment for processing a retry message.

As depicted in FIG. 9, the first step that the CM mechanism 610 performs in processing a retry later message is to determine if any incoming messages are waiting to be processed (step 902). If there are incoming messages waiting to be processed, the CM mechanism 610 invokes the HandleIncomingCall routine to process the waiting messages (step 906). After invoking the HandleIncomingCall routine, the CM mechanism 610 resends the message of the client 402 in the hope that by processing the incoming messages, the state of the server 404 has changed so that the server 404 may now be able to handle the message of the client 402 (step 916). After resending the message of the client 402, the CM mechanism 610 returns an indicator of success to the higher level processing described in FIG. 7.

However, if no incoming messages are waiting to be processed, the CM mechanism 610 invokes the RetryRejectedCall routine as implemented by the client 402 (step 904). The RetryRejectedCall routine determines the subsequent processing to be performed by the CM mechanism 610 by returning a specific return value. The CM mechanism 610 determines if the RetryRejectedCall routine has returned a value which indicates that the CM mechanism 610 should retry sending the sent message (i.e., 0 to 100) (step 908). If the RetryRejectedCall routine returns a value indicating that the CM mechanism 610 should retry sending the sent message, the CM mechanism 610 resends the message of the client 402 (step 916) and returns an indicator of success to the higher level processing described in FIG. 7. The CM mechanism 610 next determines if the return value indicates that the CM mechanism 610 should continue waiting (i.e., >100) (step 910). If the return value from the RetryRejectedCall routine indicates that the CM mechanism 610 should continue waiting, the return value indicates a specific amount of time that the CM mechanism 610 should wait (step 912). The CM mechanism 610 then waits for the specified time, resends the message of the client 402 (step 916), and returns success to the higher level processing described in FIG. 7. If, however, the return value received from the RetryRejectedCall routine does not indicate that the CM mechanism 610 should wait, the CM mechanism 610 determines that the return value indicates cancel (i.e., −1)

and returns an error to the client 402, thereby canceling the RPC of the client 302 (step 914).

When the CM mechanism 610 receives a window message, the CM mechanism 610 processes the window message so that type ahead that the user may input to the computer system will be processed as normal. However, distinguishing between type ahead and attempts of a user to get the attention of a client 402 that is not responding to the keystrokes of the user is difficult because the client 402 is waiting for a reply from the server 404. One method of solving this problem is for the client 402 to ignore all window messages that the client 402 receives while waiting for a reply from the server 404. This has the effect of locking up the computer system since the client 402 will ignore all window messages including a task switching window message. Therefore, if the server 404 does not respond to free up the client 402, the computer system is in a state of non-responsiveness. One alternative is for the client 402 to accept and process all window messages. However, if the client 402 processes all window messages, the window messages may change the state of the client 402 so that the client 402 will operate in an undesirable manner. The CM mechanism 610 solves the problem of window messages by allowing the client 402 to implement the MessagePending routine which determines the appropriate processing for the CM mechanism 610 to perform when a window message is received. The MessagePending routine is more fully described below.

Upon receiving a window message, the CM mechanism 6 10 first determines whether a connection exists between the client 402 and the server 404 and if the server 404 is in a state of operation. The client 402 determines if a connection exists by querying the RPC facility 612 and the client determines if the server is in a state of operation by querying an operating system. Both querying an RPC facility to determine if a connection exists and querying the operating system to determine if a computer program is in a state of operation are well known in the computer industry. After determining whether a connection exists and whether the server 404 is in a state of operation, the CM mechanism 610 calculates the elapsed time since the client 402 sent the message and invokes the MessagePending routine to determine the appropriate processing to perform. The MessagePending routine determines the appropriate processing for the CM mechanism 610 to perform based on the parameters of the MessagePending routine. In order to determine the appropriate processing, the MessagePending routine may query the user to determine whether the user wishes to wait or cancel the RPC of the client 402. After determining the appropriate processing for the CM mechanism 610 to perform, the MessagePending routine returns a return value. The CM mechanism 610 performs processing based on the return value returned by the MessagePending routine. The MessagePending routine may return a return value indicating that the CM mechanism 610 should wait further for a reply from the server 404, a value indicating that the CM mechanism should cancel the RPC of the client 402, or a value indicating that the CM mechanism should perform default processing. If the return value indicates that the CM mechanism 610 should perform default processing, the CM mechanism 610 performs default processing wherein window messages regarding screen painting, mouse movement, task switching, and timer messages are processed and all other window messages are discarded. A timer message is a message generated by the window manager in response to a request by the client 402 to be notified after a specified period of time. Timer messages can be used for keeping time, waking up, and multitasking. For example, the timer may be used by a client 402 in a multitasking environment in a situation where the client 402 has significant processing to perform. The client 402 may divide the significant processing into discrete units, invoke the timer, and process one discrete unit of processing at a time, thereby releasing execution to other tasks so that overall system response does not suffer. The MessagePending routine is defined in Code Table 4.

| Code Table 4 |
|---|

DWORD MessageFilter::MessagePending(htaskCallee, dwTickCount, dwPendingType)

| Argument | Type |
|---|---|
| hTaskCallee | HTASK |
| dwTickCount | DWORD |
| dwPendingType | DWORD |
| return_value | DWORD |

The hTaskCallee parameter of the MessagePending routine is an identifier of the server 404 to which the client 402 sent the message. The dwTickCount parameter of the MessagePending routine indicates the elapsed time since the client 402 sent the message to the server 404. The dwPendingType parameter of the MessagePending routine indicates the type of message that the client 402 sent to the server 404. Appropriate values for the dwPendingType include PENDINGTYPE_TOPLEVEL and PENDINGTYPE_NESTED. A value of PENDINGTYPE_TOPLEVEL in the dwPendingType parameter indicates that the message from the client 402 to the server 404 was the first message sent to the server 404 on a specific logical thread id. A value in the dwPendingType parameter of PENDINGTYPE_NESTED indicates that the message sent from the client 402 to the server 404 was a subsequent message on a specific logical thread id. The return_value parameter of the MessagePending routine has three values: PENDINGMSG_CANCELCALL, PENDINGMSG_WAITNOPROCESS, and PENDINGMSG_WAITDEFPROCESS. A value of PENDINGMSG_CANCELCALL in the return_value parameter indicates that the CM mechanism 610 should cancel the message of the client 402. A value of PENDINGMSG_WAITNOPROCESS indicates that the CM mechanism 610 should continue waiting for a reply to the message sent by the client 402. A value in the return value parameter of PENDINGMSG_WAITDEFPROCESS indicates that the CM mechanism 610 should perform default processing and continue waiting for a reply from the server 404.

Figure 10:
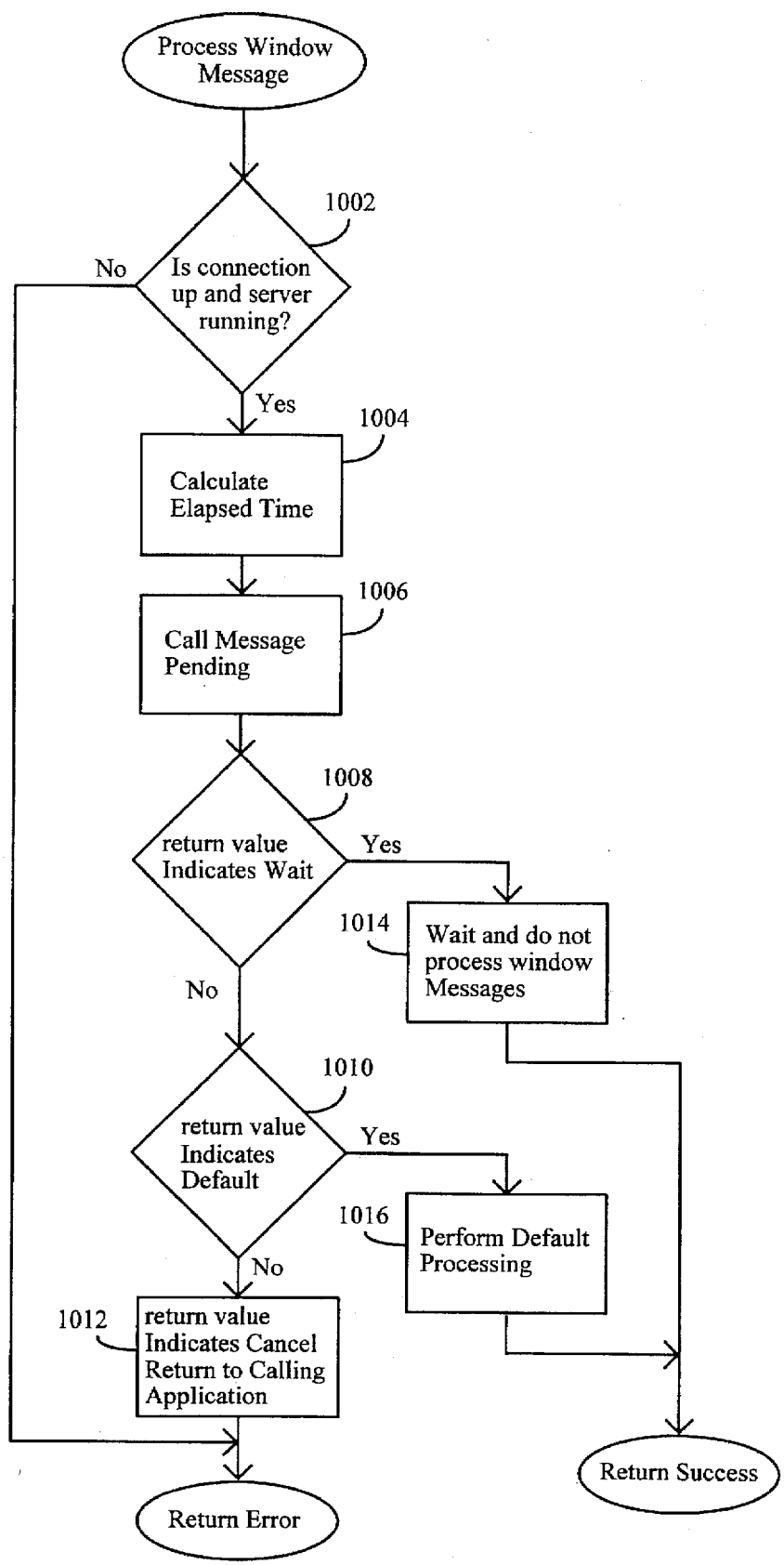
FIG. 10 depicts a flowchart of the steps performed by the concurrency management mechanism of the preferred embodiment for processing a window message.

A flowchart of the steps performed by the CM mechanism 610 upon receipt of a window message is depicted in FIG. 10. The CM mechanism 610 first determines if the client 402 and the server 404 are connected and if the server 404 is in a state of operation (step 1002). If the client 402 and server 404 are no longer connected or if the server 404 has terminated, the CM mechanism 610 returns an error to the higher level processing shown in FIG. 7, thereby canceling the RPC of the client 402. If, however, the client 402 is connected to the server 404 and the server 404 is in a state of operation, the CM mechanism 610 determines the elapsed time since the message of the client 402 was sent (step 1004). Next, the CM mechanism 610 calls the MessagePending routine as implemented by the client 402 (step 1006). The MessagePending routine determines the appropriate action for the CM mechanism 610 to perform based on the parameters of the MessagePending routine. After determining the appropriate action for the CM mechanism 610 to perform, the MessagePending routine returns a return value. The CM mechanism 610 examines the return value to determine if the return value indicates that the CM mechanism 610 should continue waiting for the server 404 to reply to the sent message by the client 402 (i.e., return value equivalent to PENDINGMSG_WAITNOPROCESS) (step 1008). If the return value of the MessagePending routine indicates that the client 402 should wait, the CM mechanism 610 waits, does not process the window message, and returns success to the higher level processing described in FIG. 7 (step 1014). The CM mechanism 610 next determines whether the return value of the MessagePending routine indicates that the CM mechanism 610 should perform default processing (i.e., return value equivalent to PENDINGMSG_WAITDEFPROCESS ) (step 1010).

If the return value indicates that the CM mechanism 610 should perform default processing, the CM mechanism 610 performs the default processing. The default processing performed by the CM mechanism 610 includes processing all window messages regarding screen painting, mouse movement, task switching, and timer messages and discarding all other window messages (step 1016). After performing the default processing, a return code of success is returned to the higher level processing described in FIG. 7. If the return value does not indicate for the CM mechanism 610 to perform default processing, then the return value indicates that the CM mechanism 610 should cancel the RPC of the client 402 (i.e., return value equivalent to PENDINGMSG_CANCELCALL) and the CM mechanism 610 returns an error to the higher level processing described in FIG. 7, thereby canceling the RPC of the client 402 (step 1012).

While the present invention has been described with reference to a preferred embodiment thereof, those skilled in the art will know of various changes in form that may be made without departing from the spirit and scope of the claimed invention as defined in the appended claims.

We claim:

1. In a computer system having a source application program that receives events, a destination application program, and a communication mechanism for sending a message between the source application program and the destination application program, a method comprising the steps of:
   providing a concurrency management mechanism to the source application program that processes events, wherein the source application program provides instructions to the concurrency management mechanism that indicate how to process the events;
   sending a message from the source application program to the destination application program using the communication mechanism, wherein the concurrency management mechanism is invoked, the message requesting a reply from the destination application program to the source application program;
   while the source application program is waiting for the reply to the message, receiving events by the source application program and processing the received events by the concurrency management mechanism in accordance with the instructions provided by the source application program to ensure that the source application program and the destination application program concurrently operate in a desirable manner; and
   receiving the reply to the message from the destination application program after processing the received events.

2. The method of claim 1 wherein said step of processing the received events includes the step of processing the received events to allow the source application program to concurrently execute a plurality of paths of execution.

3. The method of claim 1 wherein the destination application program is waiting on the source application program to perform an action and wherein said step of processing the received events includes the step of processing the received events to prevent the source application program and the destination application program from becoming deadlocked.

4. A computer system comprising:
   a source component for generating a first message and for outputting instructions;
   a destination component for receiving the first message from the source component; and
   a communication mechanism for sending the first message from said source component to said destination component and for receiving the instructions from said source component, said communication mechanism comprising:
      a concurrency management component for executing the instructions received from said source component when a second message is received by said source component from a message source while said communication mechanism is sending the first message to said destination component and before the sending of the first message has completed, the instructions to manage concurrency on behalf of said source component to ensure that said source component and said destination component concurrently operate in a desirable manner.

5. In a data processing system having a memory for storing computer programs and a communication mechanism for sending a message between the computer programs in the memory, said computer programs including a source computer program and a destination computer program, a method comprising the steps of
   providing instructions for processing messages to the communication mechanism;
   sending a first message from the source computer program to the destination computer program via the communication mechanism, the first message including a request for a response to the first message from the destination computer program; and
   receiving a second message from a message source at the source computer program;
   determining whether the second message is a response from the destination computer program indicating that the first message was successful; and
   when the second message is not a response from the destination computer program indicating that the first communication was successful, executing the instructions provided to the communication mechanism by the source computer program to determine how to process the second message.

6. The method of claim 5 wherein the data processing system has a plurality of computer systems and wherein said step of sending a first message includes the step of sending a first message from the source computer program on a first of the computer systems to the destination computer program on a second of the computer systems.

7. The method of claim 5 wherein the source computer program is a process and the destination computer program is a process separate from the source computer program and wherein said step of sending a first message includes the step of sending the first message from the source computer program to the destination computer program.

8. The method of claim 5 wherein the destination computer program has functions and wherein said step of sending a first message includes the step of invoking a function in the destination computer program by the source computer program.

9. The method of claim 5 wherein the data processing system has a plurality of computer systems connected to a local area network and wherein said step of sending a first message includes the step of sending the first message over the local area network from the source computer program on a first of the computer systems to the destination computer program on a second of the computer systems.

10. The method of claim 5 wherein the data processing system has a plurality of computer systems connected to a wide area network and wherein said step of sending a first message includes the step of sending the first message over the wide area network from the source computer program on a first of the computer systems to the destination computer program on a second of the computer systems.

11. The method of claim 5 wherein the communication mechanism communicates by placing the first message in a shared area in the memory of the computer system and wherein said step of sending a first message includes the step of sending the first message from the source computer program through the shared area of memory to the destination computer program.

12. The method of claim 5 wherein the destination computer program is waiting on the source computer program to perform an action and wherein said step of executing the instructions includes the step of executing the instructions to perform the action to prevent deadlock.

13. The method of claim 5 wherein said step of executing the instructions includes the step of executing the instructions to allow the source computer program to perform a plurality of lines of execution concurrently without crossing the lines of execution.

14. In a computer system containing a calling process, a plurality of remote processes and a communication mechanism, wherein the remote processes are in separate address space from the calling process, each process comprises procedures and each procedure is a plurality of instructions and the calling process can invoke the procedures of a first remote process, said invocation of one procedure of the first remote process being a remote procedure call, and a plurality of procedures being contingency procedures for processing messages received while the calling process is waiting for the remote procedure call to complete, a method for the calling process to invoke the remote procedure call comprising the steps of:

providing the contingency procedures to the communication mechanism so that the communication mechanism can process messages received while the calling process is waiting for the remote procedure call to complete;

while the calling process is waiting for the remote procedure call to complete, receiving a first message from a second remote process and invoking a first of the contingency procedures in response to receiving the first message;

receiving a second message from a computer user and invoking a second of the contingency procedures in response to receiving the second message; and receiving a reply to the remote procedure call, said reply indicating that the remote procedure call was unsuccessful but may be retried and invoking a third of the contingency procedures in response to receiving the reply.

15. The method of claim 14 wherein the calling process executes multiple threads of execution, wherein said step of providing the contingency procedures includes the step of providing the contingency procedures to allow the calling process to execute multiple threads of execution simultaneously.

16. The method of claim 14 wherein the calling process can wait on the remote process to perform a first action and wherein the remote process can wait on the calling process to perform a second action and wherein the calling process defines deadlock contingency procedures that allow the calling process to perform the second action to prevent deadlock, wherein said step of providing the contingency procedures includes the step of providing deadlock contingency procedures.

17. The method of claim 14 wherein said step of invoking the first of the contingency procedures includes the steps of:

maintaining states for the calling process, said states comprising an acceptable state for receiving messages and unacceptable states for receiving messages, said unacceptable states for receiving messages comprising permanent unacceptable states and temporary unacceptable states;

determining whether the calling process is in one of the acceptable states for receiving the first message by examining contents of the first message;

when the calling process is in one of the acceptable states for receiving the first message, sending the first message to the calling process;

when the calling process is in one of the unacceptable states for receiving the first message, determining whether the unacceptable state is a permanent unacceptable state or a temporary unacceptable state;

when the calling process is in a permanent unacceptable state, sending a third message to the remote process indicating that the calling process is unable to accept the first message; and when the calling process is in a temporary unacceptable state, sending a fourth message to the remote process indicating that the remote process may resend the first message.

18. The method of claim 14 wherein said step of invoking the second of the contingency procedures includes the steps of:

determining an amount of time elapsed since the remote procedure call was invoked by the calling process;

determining to wait for the remote procedure call to finish when the amount of time elapsed is less than a predetermined amount of time;

querying the computer user whether to continue waiting for the remote procedure call when the amount of time elapsed is greater than a predetermined amount of time;

canceling the remote procedure call when the computer user indicates;

determining to wait for the remote procedure call when the computer user indicates; and determining to perform actions indicated by the second message when the second message indicates manipulation of information displayed by a computer display.

19. The method of claim 14 wherein said step of invoking a third of the contingency procedures includes the steps of:

determining whether a fifth message has been received from a message source and is waiting to be processed;

when it is determined that the fifth message is waiting to be processed, invoking the first of the contingency procedures to process the fifth message waiting to be processed; and reinvoking the remote procedure call on the remote process;

when it is determined that the fifth message is not waiting to be processed, querying the computer user whether to retry the remote procedure call, whether to cancel the remote procedure call or whether to switch execution of the computer system to the first remote process;

retrying the remote procedure call when the computer user indicates;

canceling the remote procedure call when the computer user indicates; and switching execution of the computer system to the first remote process when the computer user indicates.

20. A computer-readable memory device that contains an interface data structure comprising a plurality of entries, the interface data structure for use in sending reply-based messages from a source application program to a destination application program using a communication mechanism in a computer system, the reply-based messages requesting replies from the destination application program to the source application program, the computer system having a concurrency management component that is provided to the source application program and that processes incoming messages by invoking functions contained in the interface data structure, wherein incoming messages are messages received by the source application program while the source application program is waiting to receive a reply from the destination application program to a reply-based message, the interface data structure being registered with the concurrency management component by the source application program, each entry comprising:

a function containing instructions provided by the source application program for use by the concurrency management component to process incoming messages received by the source application program while the source application program is waiting to receive a reply to a reply-based message from the destination application program.

21. In a computer system having a source application program, a destination application program, and a communication mechanism for sending a message between the source application program and the destination application program, a method comprising the steps of:

providing a concurrency management mechanism to the source application program to prevent the source application program and the destination application program from becoming deadlocked, wherein the source application program provides instructions to the concurrency management mechanism that indicate how to prevent becoming deadlocked;

invoking the concurrency management mechanism to send a message from the source application program to the destination application program, wherein the concurrency management mechanism invokes the communication mechanism to send the message to the destination application program, the message requesting a reply from the destination application program to the source application program;

while the source application program is waiting for the reply to the message, receiving events by the concurrency management mechanism that are destined for the source application program; and processing the received events by the concurrency management mechanism in accordance with the instructions provided by the source application program to prevent the source application program and the destination application program from becoming deadlocked; and receiving the reply to the message from the destination application program after processing the received events.

22. In a computer system having a source computer program, a destination computer program, and a communication mechanism for sending messages in the computer system, the messages having types, a first type of the messages requesting replies from the destination computer program to the source computer program, a method comprising the steps of:

providing a concurrency management mechanism to the source computer program that processes incoming messages while the reply to a message of the first type is pending and not yet received by the source computer program, wherein incoming messages are a second type of the messages that are received by the source computer program while the reply to a message of the first type is pending;

configuring the concurrency management mechanism by the source computer program with functionality to process the incoming messages;

invoking the concurrency management mechanism to send one of the messages of the first type from the source computer program to the destination computer program, wherein the concurrency management mechanism invokes the communication mechanism to send the one message to the destination computer program;

while the reply to the one message is pending, receiving incoming messages from the communication mechanism by the concurrency management mechanism, wherein the incoming messages are destined for the source computer program; and processing the received incoming messages by the concurrency management mechanism in accordance with the functionality configured by the source computer program to ensure that the source computer program and the destination computer program concurrently operate in a desirable manner; and receiving the reply to the one message from the destination computer program after processing the received incoming messages.

23. The method of claim 22 wherein said step of configuring the concurrency management mechanism includes the step of providing the concurrency management mechanism with instructions for processing the incoming messages.

24. A computer-readable medium containing instructions for controlling a computer system to transfer messages, the computer system having a source application program that receives events, a destination application program, and a communication mechanism for sending messages between the source application program and the destination application program, by performing the steps of:

providing a concurrency management mechanism to the source application program that processes events, wherein the source application program provides instructions to the concurrency management mechanism that indicate how to process the events;

sending a message from the source application program to the destination application program using the communication mechanism, wherein the concurrency management mechanism is invoked, the message requesting a reply from the destination application program to the source application program;

while the source application program is waiting for the reply to the message, receiving events by the source application program and processing the received events by the concurrency management mechanism in accordance with the instructions provided by the source application program to ensure that the source application program and the destination application program concurrently operate in a desirable manner; and receiving the reply to the message from the destination application program after processing the received events.

25. A computer-readable medium containing instructions for controlling a computer system to transfer messages, the computer system having a source application program, a destination application program, and a communication mechanism for sending messages between the source application program and the destination application program, by performing the steps of:

providing a concurrency management mechanism to the source application program to prevent the source application program and the destination application program from becoming deadlocked, wherein the source application program provides instructions to the concurrency management mechanism that indicate how to avoid becoming deadlocked;

invoking the concurrency management mechanism to send a message from the source application program to the destination application program, wherein the concurrency management mechanism invokes the communication mechanism to send the message to the destination application program, the message requesting a reply from the destination application program to the source application program;

while the source application program is waiting for the reply to the message,
  receiving events by the concurrency management mechanism that are destined for the source application program; and
  processing the received events by the concurrency management mechanism in accordance with the instructions provided by the source application program to prevent the source application program and the destination application program from becoming deadlocked; and receiving the reply to the message from the destination application program after processing the received events.

26. A computer-readable medium containing instructions for controlling a computer system to transfer messages, the computer system having a source computer program, a destination computer program, and a communication mechanism for transferring the messages in the computer system, the messages having types, a first type of the messages requesting replies from the destination computer program to the source computer program, by performing the steps of:

providing a concurrency management mechanism to the source computer program that processes incoming messages while the reply to a message of the first type is pending and not yet received by the source computer program, wherein incoming messages are a second type of the messages that are received by the source application program while the reply to a message of the first type is pending;

configuring the concurrency management mechanism by the source computer program with functionality to process the incoming messages;

invoking the concurrency management mechanism to send one of the messages of the first type from the source computer program to the destination computer program, wherein the concurrency management mechanism invokes the communication mechanism to send the one message to the destination computer program;

while the reply to the one message is pending,
  receiving incoming messages from the communication mechanism by the concurrency management mechanism, wherein the incoming messages are destined for the source application program; and
  processing the received incoming messages by the concurrency management mechanism in accordance with the functionality configured by the source computer program to ensure that the source computer program and the destination computer program concurrently operate in a desirable manner; and receiving the reply to the one message from the destination computer program after processing the received events.

27. The instance of computer-readable media of claim 26, wherein said step of configuring the concurrency management mechanism includes the step of providing the concurrency management mechanism with instructions for processing the incoming messages.

* * * * *